(12) United States Patent
Servant

(10) Patent No.: US 7,690,206 B2
(45) Date of Patent: Apr. 6, 2010

(54) SYSTEM FOR CONNECTING AN ENGINE SHAFT WITH A RETRACTABLE NUT

(75) Inventor: Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 563 days.

(21) Appl. No.: 11/668,233

(22) Filed: Jan. 29, 2007

(65) Prior Publication Data

US 2007/0177936 A1    Aug. 2, 2007

(30) Foreign Application Priority Data

Jan. 30, 2006    (FR) .................... 06 50317

(51) Int. Cl.
*F02C 3/10* (2006.01)

(52) U.S. Cl. .......................... 60/792; 60/796

(58) Field of Classification Search .............. 60/792, 60/796, 802, 805; 415/122.1
See application file for complete search history.

(56) References Cited

U.S. PATENT DOCUMENTS

| 2,089,168 | A | * | 8/1937 | Brown ..................... 403/259 |
| 2,611,632 | A | * | 9/1952 | Harris ..................... 403/333 |
| 2,738,125 | A | | 3/1956 | Ledwith |
| 3,226,987 | A | * | 1/1966 | McCarty ................... 74/15.63 |
| 3,343,854 | A | * | 9/1967 | Dennison .................. 403/320 |
| 3,602,535 | A | | 8/1971 | Behning et al. |
| 3,631,688 | A | * | 1/1972 | Quick ..................... 464/182 |
| 4,456,425 | A | * | 6/1984 | McCarty et al. ........ 415/122.1 |

FOREIGN PATENT DOCUMENTS

| EP | 0 987 457 A1 | 3/2000 |
| EP | 1 498 624 A1 | 1/2005 |
| FR | 2 633 023 A1 | 12/1989 |
| GB | 2 088 015 A | 6/1982 |

OTHER PUBLICATIONS

U.S. Appl. No. 11/627,625, filed Jan. 26, 2007, Galivel et al.

* cited by examiner

*Primary Examiner*—Michael Cuff
*Assistant Examiner*—Vikansha S Dwivedi
(74) *Attorney, Agent, or Firm*—Oblon, Spivak, McClelland, Maier & Neustadt, L.L.P.

(57) ABSTRACT

A system for fastening the end of a gas turbine engine shaft engaged inside a sleeve supported by a bearing is disclosed. The system includes a nut that is screwed at one end inside the sleeve, and is connected by a split annular ring with the shaft at the other end.

14 Claims, 4 Drawing Sheets

SYSTEM FOR CONNECTING AN ENGINE SHAFT WITH A RETRACTABLE NUT

BACKGROUND OF THE INVENTION AND DESCRIPTION OF THE PRIOR ART

The present invention relates to a gas turbine engine, in particular in the aeronautical field, and is aimed at mounting a rotor shaft inside the engine.

The operations of mounting and demounting a turbine engine are complicated owing to the number of parts which constitute it and of the small clearances between them even though their dimensions may be large. The cost of carrying out work on the engine which comprises such operations is consequently always high. It is therefore constantly sought to simplify them. In a twin-spool, front turbofan engine, such as the cfm56 engine, access to the support bearing of the high-pressure compressor shaft is particularly difficult since it is mounted, at the level of the intermediate casing, to the rear of the fan and of the two first bearings supporting the low-pressure compressor shaft and the fan shaft, respectively. The intermediate casing is that part of the machine casing which particularly supports the front bearings of the rotors. To avoid demounting the entire front part of the engine and of the fan in particular, the elements of this bearing are currently arranged is such a way as to allow mounting from the rear. Such a solution, although advantageous, still has a number of drawbacks which it would be desirable to eliminate.

With reference to FIGS. 1 and 2, a solution corresponding to the teaching of the prior art is reviewed. The engine assembly is not represented, only the immediate surroundings of the bearing being visible. The front and rear are defined with respect to the forward travel direction of the engine. Part of the fixed structure of the intermediate casing 2 is shown, with the ball bearing 3 of the HP compressor shaft being supported by its outer race in this fixed structure. The bearing rotationally supports the front end of the HP compressor shaft 4, of which the journal 4' and a rotor disk 4" can be seen. The bearing supports at its front a bevel gear 5 which drives the gear 5' connected to a radial shaft, forming the inlet gearbox (IGB) used to drive the auxiliary equipment: pumps, electrical current generators or the like. The bevel gear meshes, for this purpose, with the gear of the radial transmission shaft which is housed in one of the radial arms of the intermediate casing so as to drive the gears of the accessory gearbox (AGB). The bevel gear is fixedly connected to the cylindrical sleeve supported by the bearing.

To maintain the shaft 4 in the bearing 3, a nut 6 is provided according to the prior art and is retained inside the gear 5, at the upstream end, by a segment or snap ring 6'. The nut comprises a thread on its external surface by means of which it is screwed inside the upstream end of the shaft 4, this end being provided with a suitable thread. A nut retainer 6", which is secured against rotation by axial splines in the shaft 4 and has flexible tabs which lock into a circular groove in the shaft 4, prevents the nut from accidentally loosening. Furthermore, axial splines on the internal wall of the sleeve of the gear 5 cooperate with splines on the external surface of the shaft 4 to prevent any rotation of one with respect to the other. This mounting incorporates the auto-extraction function of the HP compressor. The function is provided by the segment which axially secures the bearing nut to the bevel wheel. Thus, by screwing the nut into the thread of the HP compressor shaft, the compressor is mated with the bearing; conversely, by unscrewing the nut, the compressor is pushed away rearwardly since the nut is blocked axially by the segment.

FIG. 2 shows the bearing before the shaft 4 is mounted. The nut, arranged in front of the bearing, is mounted beforehand on the gear before any mounting of the elements from the rear of the intermediate casing. To prepare for the mounting of the shaft 4, the bearing 3 is heated at C in order to expand it and minimize the shrinkage forces. To avoid heating the nut 6 and minimize the friction in the thread when tightening it on the shaft 4, a thermal protection P is placed around the nut. However, this protection is complicated to implement. It cannot be installed effectively.

SUMMARY OF THE INVENTION

The objective set by the applicant is to prevent the problems associated with this mounting.

More specifically, the problem to be solved concerns a type of connection between the HP compressor and the engine IGB that allows mounting and demounting of the HP compressor with sole access for the tools from the rear of the engine.

According to the invention, the system for fastening the end of a gas turbine engine shaft engaged inside a sleeve supported by a bearing, by means of a nut, is characterized in that the nut is screwed at one end inside said sleeve, and is connected by a segment-type connection with the shaft at the other end.

The solution of the invention is thus suitable for mounting the HP compressor shaft of a twin-spool engine whose power take-off for driving the gearbox of the auxiliary machines is provided by a bevel gear fixed thereto, the sleeve belonging to this driving bevel gear.

The solution of the invention makes it possible, by virtue of the segment-type connection, to retract the nut inside the shaft while the shaft is being mated with the bearing and then, by simply displacing the nut axially with the aid of a tool situated remotely to the rear, to bring the nut into contact with the front thread of the sleeve and to screw the nut to ensure fastening. Demounting of the HP compressor is also carried out in a simple manner by acting solely from the rear of the engine, and is not compromised by the mounting means and tools currently used.

Mounting/demounting from the rear of the engine is a major advantage for this type of engine and considerably reduces the cost of such an operation.

Furthermore, the solution is compact, it can be incorporated within the available space and does not interfere with the flow of air between the IGB and the LP shaft.

BRIEF DESCRIPTION OF THE DRAWINGS

The invention will now be described in more detail with reference to the appended drawings, in which.

DESCRIPTION OF THE PREFERRED EMBODIMENTS

Figure 3:
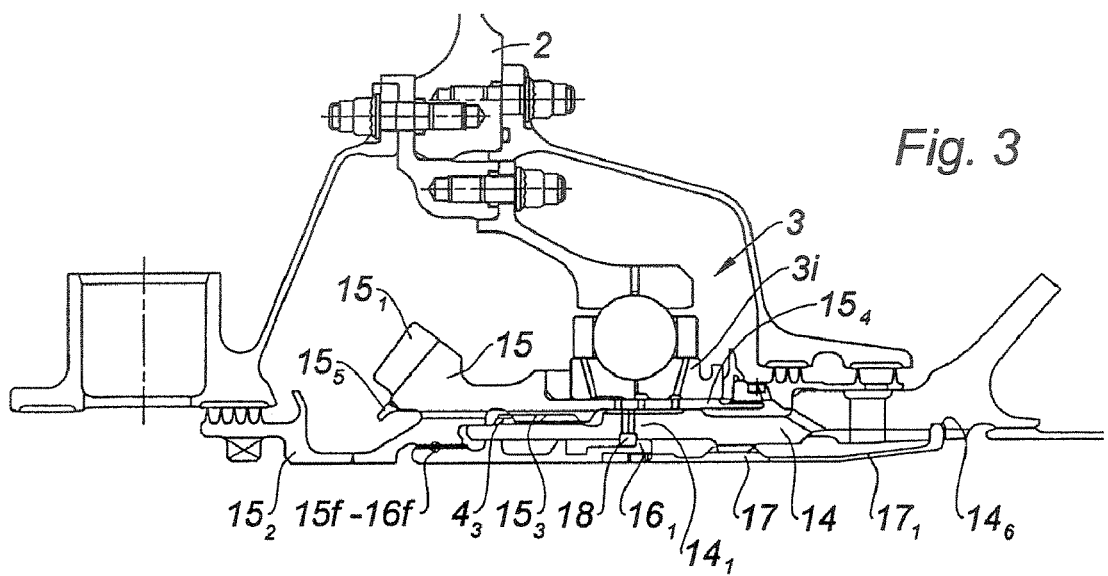
FIG. 3 represents in axial half-section a partial view of a system for fastening the end of the HP compressor shaft according to the invention.

FIG. 3 and the figures which follow show an embodiment of the solution of the invention. The bearing 3 remains unchanged with respect to the prior art, as does the intermediate casing 2. The upstream end of the shaft 14, forming a journal and belonging to the HP compressor rotor of a twin-spool turbine engine, has an inner annular channel or groove $14_1$ in which there is housed a split annular segment 18 having a rectangular cross section in this case. The segment 18 cooperates with an axial stop surface $16_1$ formed on the external surface of a nut 16. This nut 16 is of cylindrical shape and connects the shaft 14 to a bevel wheel 15. The bevel wheel 15 comprises a bevel gear $15_1$ for driving the IGB. It also comprises a cylindrical sleeve $15_4$ shrink-fitted with the inner race $3i$ of the bearing 3. At its front, the wheel 15 is fixedly connected here to a labyrinth seal $15_2$. Splines $15_3$ are formed internally to cooperate with splines $14_3$ on the journal 14 and keep them fixed against rotation. The wheel 15 also comprises an internal portion having a cylindrical surface with a thread $15f$ with which the cylindrical nut 16 cooperates by way of a thread $16f$.

Figure 4:
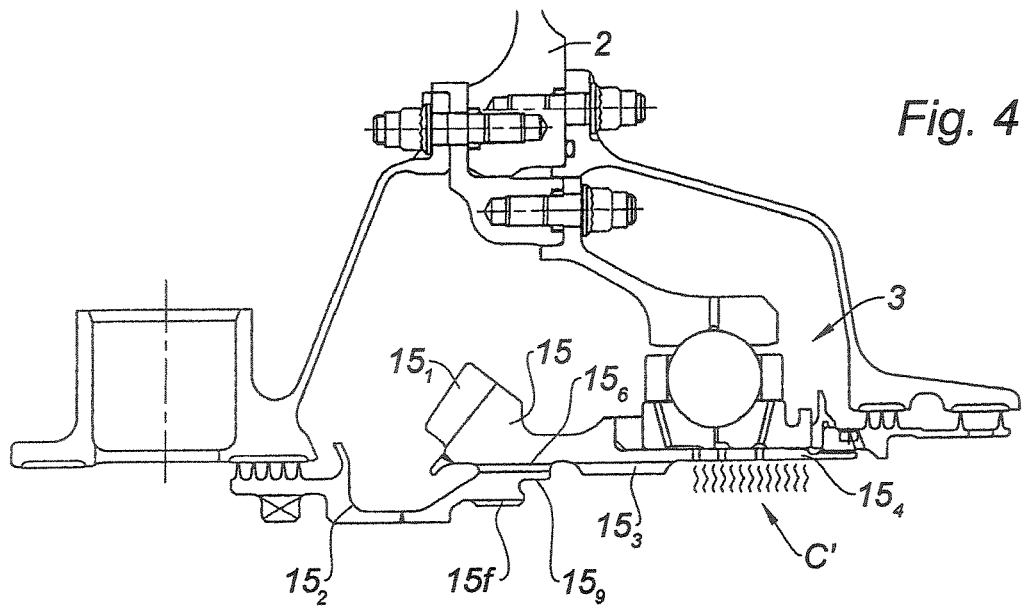
FIG. 4 shows the first step of the mounting seen from the IGB side upstream of the HP compressor shaft.

FIG. 4 shows the bearing 3 with the bevel wheel 15 mounted on the inner race $3i$ of the bearing 3, and a heating means C' depicted by wavy lines.

The front mounting of the HP compressor shaft in the bearing 3 will now be described with reference to FIG. 4 and the figures which follow.

The bearing is already assembled with the bevel wheel 15 shrink-fitted inside the race $3i$ of the bearing. The first step consists in heating the bearing 3 by placing a heater below the race $3i$. The advantage of the solution of the invention will already be appreciated since, in the absence of a nut, no unwanted heating will adversely affect the surrounding parts.

Figure 5:
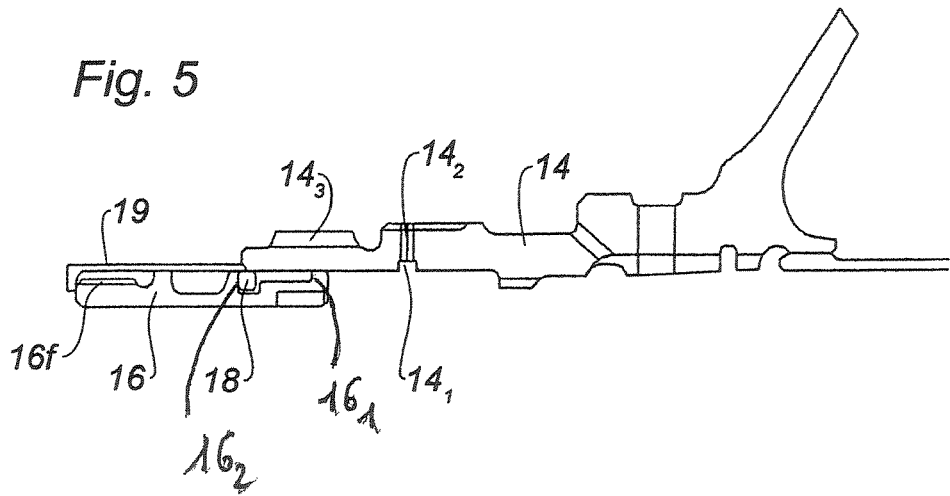
FIG. 5 shows the first step of the mounting seen from the HP compressor shaft side.

At the same time, the nut 16 is fitted on the shaft as shown in FIG. 5. The nut 16, of cylindrical general shape, has an external diameter equal to the internal diameter of the shaft 14. It additionally comprises a transverse groove $16_2$ of sufficient depth to ensure that the segment 18 will be housed entirely therein when it is deformed by radial compression and its diameter reduced. For this purpose, a sleeve 19 which keeps the segment 18 retracted has been engaged. The internal diameter of the sleeve 19 is the same as the internal diameter of the shaft. In this way, as can be seen from FIG. 5, in the retracted position the outside diameter of the segment allows it to slide inside and along the shaft 14. The nut is slid until the segment 18 meets the groove $14_1$. By virtue of its elasticity the segment now adopts its natural shape and is pressed into the groove $14_1$. The groove $16_2$ in the nut forms an axial stop which allows the segment to be brought up to the groove $14_1$ in the shaft 14 and which prevents the nut from being inserted further forward into the shaft 14. It can be observed that the shaft comprises a number of radial orifices $14_2$ level with the groove in order, when it is desired to extract the nut from the shaft, to apply a tool by means of which the segment 18 can be retracted into the groove $16_2$ in the nut.

Figure 6:
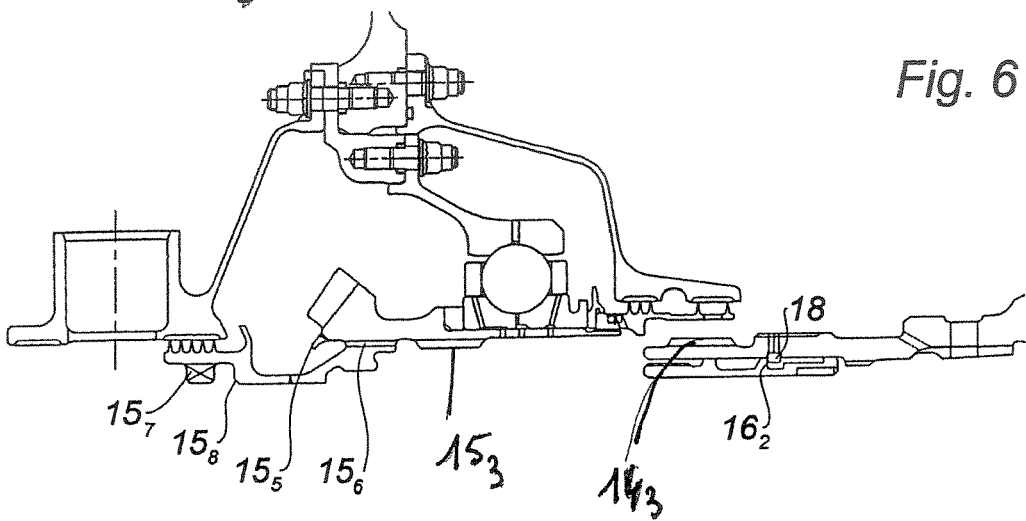
FIG. 6 shows the second step with the mating of the compressor shaft.

FIG. 6 shows that the shaft will be engaged in the bearing from which the heater has been removed and which is in the expanded state. The nut 16 is retracted and secured axially in the shaft 14 by the segment 18 which bears both in the channel $14_1$ and against the stop formed by the groove $16_2$.

Figure 1:
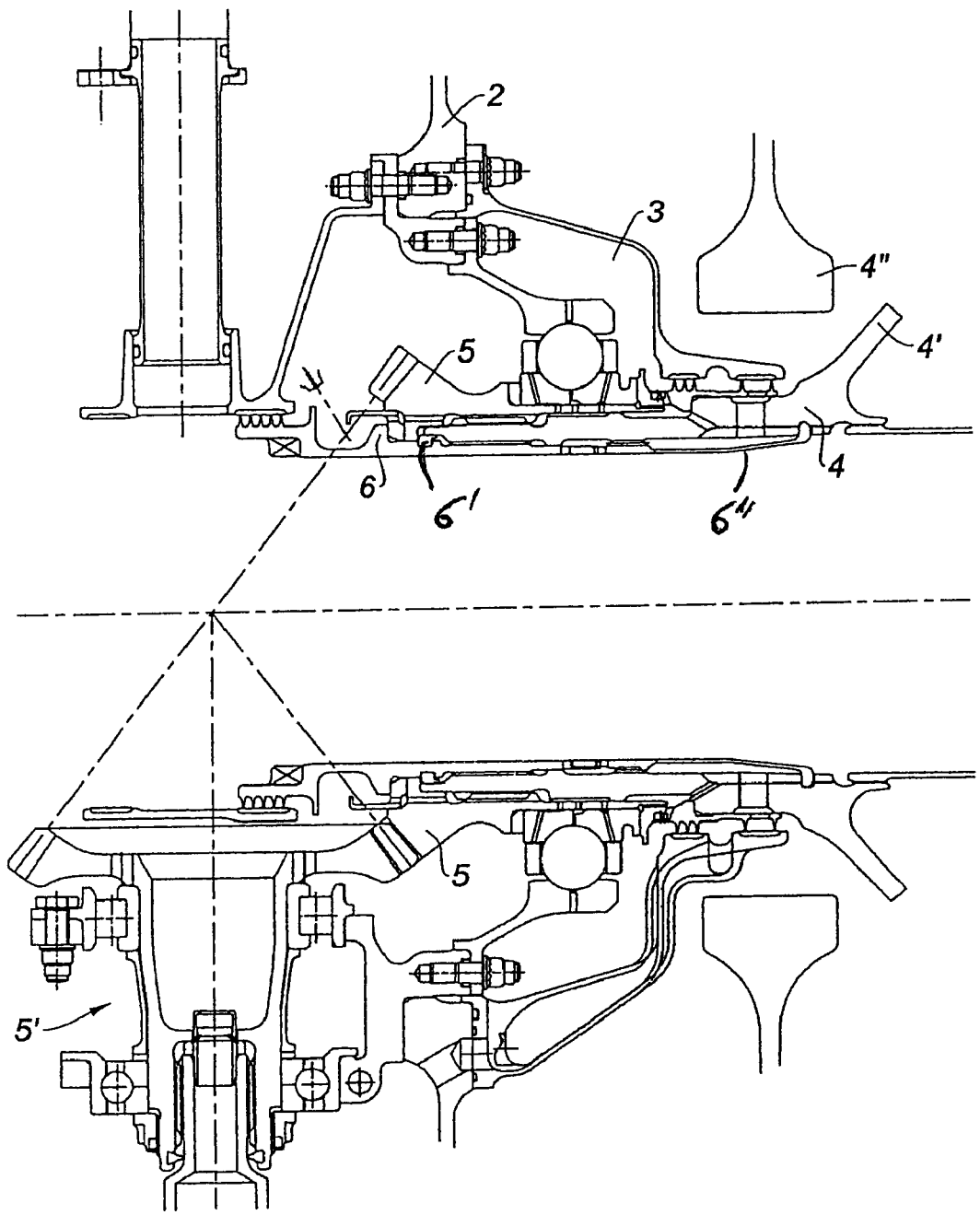
FIG. 1 represents in axial section a partial view of a mounting solution corresponding to the teaching of the prior art.
Figure 2:
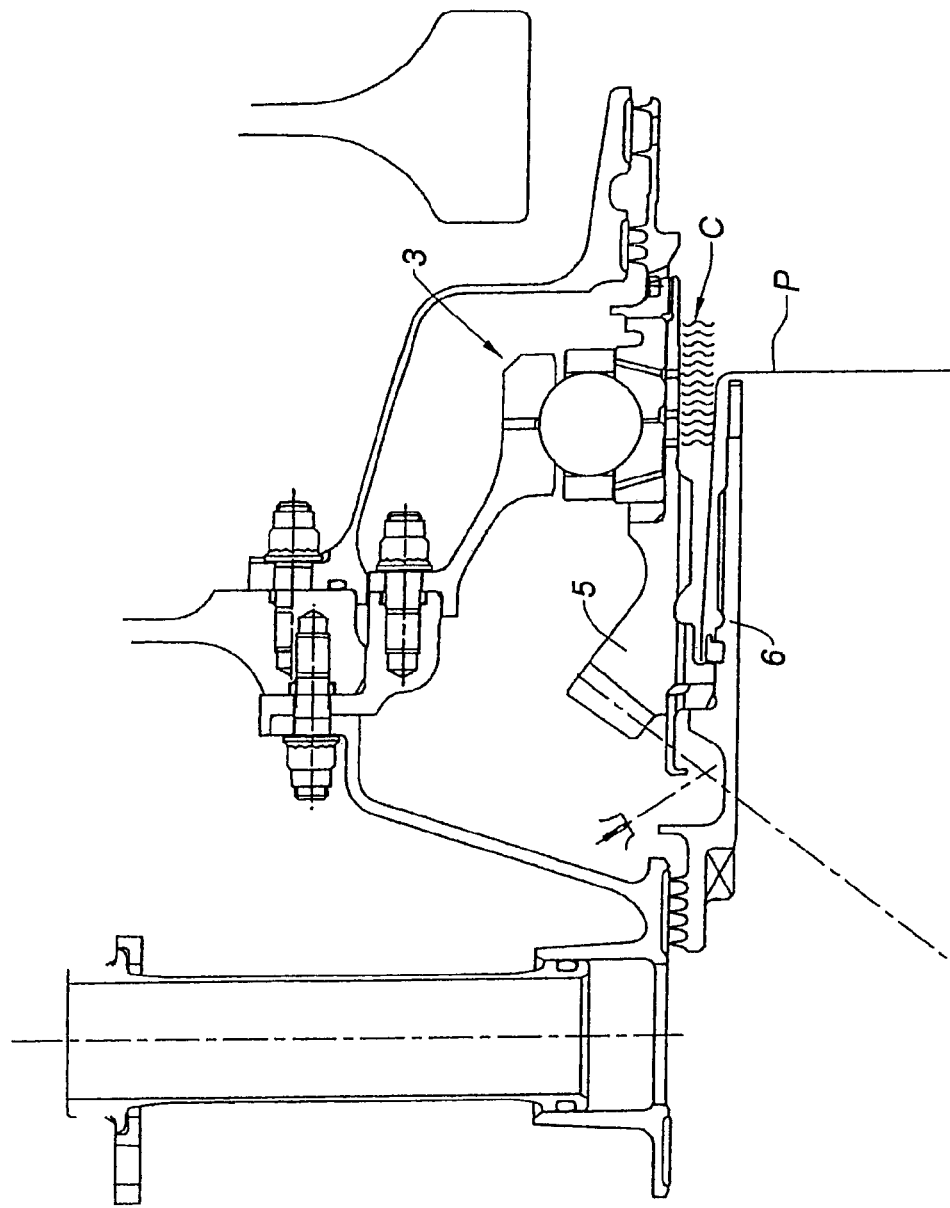
FIG. 2 shows the elements of FIG. 1 preassembled and prior to the mounting of the HP compressor shaft.
Figure 7:
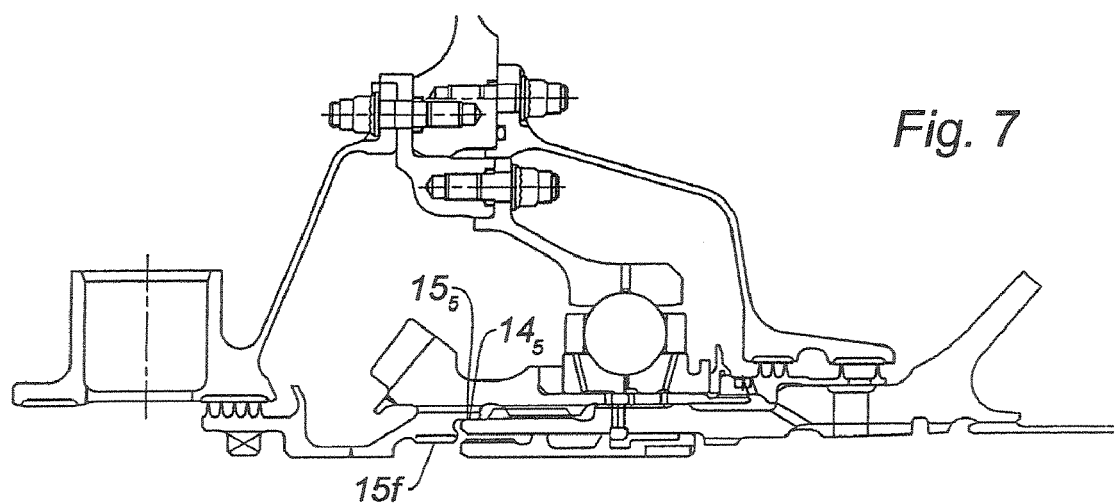
FIG. 7 shows the more advanced engagement of the compressor shaft.

FIG. 7 shows that the shaft has been completely engaged in the bearing 3. The splines $14_3$ cooperate with the splines $15_3$ of the sleeve of the bevel wheel 15 so as to secure them against rotation. The front end $14_5$ of the shaft butts against the rear labyrinth-forming part that bears on the inner race of the rolling bearing 3. It can also be observed that the outer cylindrical surface of the end portion on the shaft 14 is engaged in an internal shrink-fitting surface of the wheel 15. This arrangement provides effective support for the gear $15_1$ to ensure that it will not deform and will turn round truly during operation.

Figure 8:
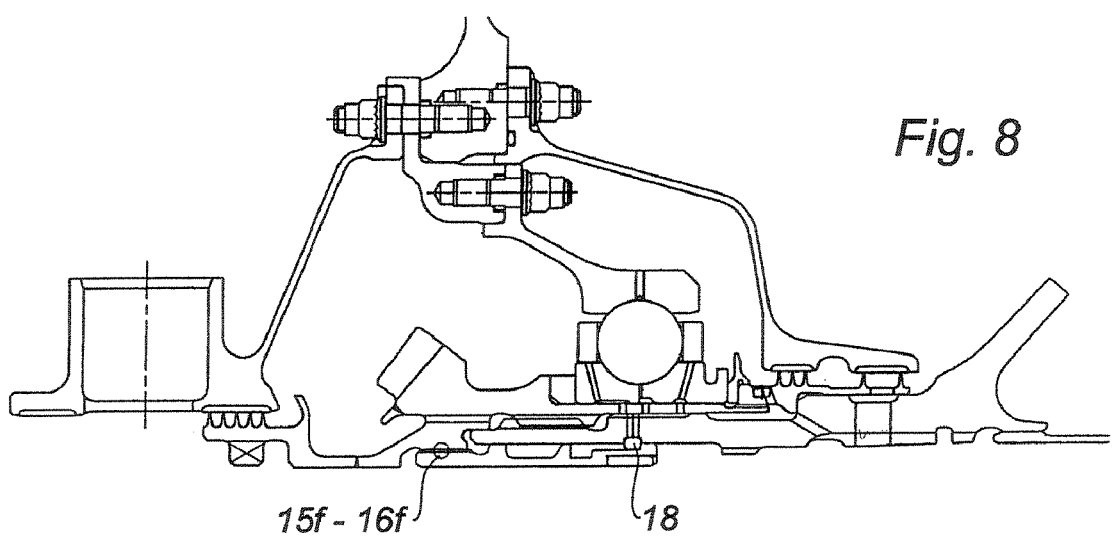
FIG. 8 shows that the screwing of the retractable nut onto the sleeve of the bearing is completed and that the nut retainer as described in FIG. 3 can be fitted.

As can be seen from FIG. 8, the nut has been screwed by engaging the respective threads $15f$ of the bevel wheel 15 and $16f$ of the nut 16. The screwing has been carried out by means of a suitable tool from the rear of the shaft 14. This screwing has been carried out until the stop surface $16_1$ of the nut comes to bear against the segment 18 housed in the groove $14_1$.

Returning to FIG. 3, it can be seen that the shaft now butts against the various internal shoulders of the bevel wheel. A nut retainer 17 has been fitted. It cooperates with the nut 16 by way of notches to prevent it from rotating with respect to the shaft. It comprises elastically deformable branches $17_1$ which are housed in a groove $14_6$ made in the shaft 14. It is possible to observe the presence of the front part $15_2$ of the bevel wheel which, together with a scoop $15_5$, forms a surface for receiving lubricating oil for the gear $15_1$ and for the bearing 3. The oil distribution nozzle is not represented. This oil collected by the scoop $15_5$ is guided through longitudinal ducts $15_6$, between the splines $15_3$ and some specially leveled splines $14_3$, toward the bearing 3 which is provided with known orifices suitable for lubricating the balls.

The nut 16 may be termed retractable in so far as it is retracted into the shaft 14. The nut is turned by known tools through the shaft particularly from the rear. To prevent forces from passing through the bearing, the bevel wheel can be clamped axially by means of a suitable tool which is placed, for example, in an axial clamping region formed between tenons $15_7$, produced at the front of the wheel to prevent any rotation during the mounting, and a shoulder $15_8$.

The invention claimed is:

1. A system for fastening an end of a gas turbine engine shaft engaged inside a cylindrical sleeve of a bevel wheel comprising:
    a bearing which supports the cylindrical sleeve of the bevel wheel;
    a nut; and
    a split annular ring,
    wherein the nut is screwed at a first end inside said cylindrical sleeve at a first inner circumference of the cylindrical sleeve, and is connected by the split annular ring with the shaft at a second end of the nut, and
    wherein a second inner circumference of the cylindrical sleeve is held in abutting contact with an outer circumference of the shaft.

2. The system as claimed in claim 1, wherein the nut is of cylindrical shape and comprises an outer groove of sufficient depth to contain the split circular ring in a retracted position.

3. The system as claimed in claim 2, wherein the nut comprises a first stop-forming surface which the split annular ring in an axial direction, the stop-forming surface being separate from the groove.

4. The system as claimed in claim 3, wherein the split annular ring is housed over part of its height in a groove disposed in an inner circumference of the shaft when the split annular ring abuts the first stop-forming surface.

5. The system according to claim 3, wherein the split annular ring abuts the first stop-forming surface in the retracted position and abuts a second stop-forming surface when the nut is screwed inside the cylindrical sleeve.

6. The system as claimed in claim 1, wherein the system further comprises a nut retainer.

7. The system according to claim 6, wherein the nut retainer includes a plurality of elastically deformable branches which fit into a recess disposed on an inner circumference of the shaft.

8. The system as claimed in claim 1, wherein the shaft and the sleeve are guided one within the other by axial splines.

9. The system as claimed in claim 1, wherein the shaft is an HP compressor shaft of a twin-spool gas turbine engine and the bevel wheel drives a transmission shaft of an accessory gearbox.

10. The system as claimed in claim 9, wherein the bevel wheel comprises a clamping device which clamps the bearing axially during screwing of the nut.

11. A gas turbine engine compressor comprising a system for fastening its shaft as claimed in claim 1.

12. A gas turbine engine comprising a system for fastening the compressor shaft as claimed in claim 1.

13. The system according to claim 1, wherein a front end of the bevel wheel is fixedly connected to a labyrinth seal.

14. The system according to claim 1, wherein an outer race of the bearing is supported by an intermediate casing and the cylindrical sleeve of the bevel wheel is shrink-fitted onto an inner race of the bearing.

\* \* \* \* \*

UNITED STATES PATENT AND TRADEMARK OFFICE
CERTIFICATE OF CORRECTION

PATENT NO. : 7,690,206 B2
APPLICATION NO. : 11/668233
DATED : April 6, 2010
INVENTOR(S) : Regis Eugene Henri Servant It is certified that error appears in the above-identified patent and that said Letters Patent is hereby corrected as shown below:

Column 4, line 16, change "stop surface 16," to --stop surface $16_1$--

Signed and Sealed this

Sixth Day of July, 2010

David J. Kappos
*Director of the United States Patent and Trademark Office*